US010626927B2

(12) United States Patent
Aramoto et al.

(10) Patent No.: US 10,626,927 B2
(45) Date of Patent: Apr. 21, 2020

(54) CLUTCH AND ACTUATOR INCLUDING THE SAME

(71) Applicant: JTEKT CORPORATION, Osaka-shi, Osaka (JP)

(72) Inventors: Gento Aramoto, Osaka (JP); Tomoya Yamatani, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 132 days.

(21) Appl. No.: 15/928,237

(22) Filed: Mar. 22, 2018

(65) Prior Publication Data

US 2018/0283467 A1    Oct. 4, 2018

(30) Foreign Application Priority Data

Mar. 31, 2017  (JP) ................................ 2017-072086

(51) Int. Cl.
| | | |
|---|---|---|
| *F16D 15/00* | (2006.01) | |
| *E05D 15/06* | (2006.01) | |
| *E05F 15/662* | (2015.01) | |
| *E05F 15/657* | (2015.01) | |
| *F16D 41/067* | (2006.01) | |
| *F16H 1/16* | (2006.01) | |

(52) U.S. Cl.
CPC ............. *F16D 15/00* (2013.01); *E05D 15/06* (2013.01); *E05F 15/657* (2015.01); *E05F 15/662* (2015.01); *F16D 41/067* (2013.01); *E05Y 2201/216* (2013.01); *F16H 1/16* (2013.01)

(58) Field of Classification Search
CPC ...... F16D 15/00; F16D 41/067; E05F 15/657; E05F 15/662; E05D 15/06
See application file for complete search history.

(56) References Cited

U.S. PATENT DOCUMENTS

| | | | | |
|---|---|---|---|---|
| 5,924,510 | A  * | 7/1999 | Itoh ..................... | B60K 17/3505 180/197 |
| 8,347,750 | B2 * | 1/2013 | Bodine ................... | F16D 7/002 192/38 |
| 10,337,569 | B2 * | 7/2019 | Geiser ..................... | F16D 27/00 |
| 2003/0000796 | A1 * | 1/2003 | Kawai ................... | F16D 41/067 192/223.2 |

(Continued)

FOREIGN PATENT DOCUMENTS

JP    2009-121606 A    6/2009

*Primary Examiner* — Zakaria Elahmadi
(74) *Attorney, Agent, or Firm* — Oliff PLC (57) ABSTRACT

An actuator includes a motor, a first gear coupled to the motor, a second gear that meshes with the first gear, and a clutch. The clutch includes an outer ring and an inner ring. A plurality of wedge spaces are formed along a circumferential direction between an inner peripheral surface portion of the outer ring and an outer peripheral surface portion of the inner ring. The clutch further includes rolling elements provided in the wedge spaces. While a radial load is not applied to the outer ring, each rolling element does not engage with the outer peripheral surface portion or the inner peripheral surface portion, so that a clearance is generated. While the radial load is applied to the outer ring, each rolling element engages with the outer peripheral surface portion and the inner peripheral surface portion without the clearance.

12 Claims, 10 Drawing Sheets

(56) References Cited

U.S. PATENT DOCUMENTS

| | | | | |
|---|---|---|---|---|
| 2003/0226415 | A1* | 12/2003 | Baker | F16D 41/067 74/333 |
| 2004/0003956 | A1* | 1/2004 | Furumi | B62D 7/148 180/445 |
| 2004/0200684 | A1* | 10/2004 | Aida | F16D 41/067 192/45.006 |
| 2005/0133329 | A1* | 6/2005 | Gradu | F16D 21/04 192/38 |
| 2008/0078647 | A1* | 4/2008 | Watanabe | F16D 41/064 192/41 A |
| 2009/0250854 | A1* | 10/2009 | Harada | F16D 15/00 267/154 |
| 2011/0036678 | A1 | 2/2011 | Hashizume et al. | |
| 2013/0167678 | A1* | 7/2013 | Eluard | B64C 25/405 74/405 |
| 2013/0278100 | A1* | 10/2013 | Fujiwara | H02K 7/08 310/90 |
| 2013/0283949 | A1* | 10/2013 | Fujiwara | F16D 15/00 74/405 |
| 2014/0090945 | A1* | 4/2014 | Fujiwara | F16D 41/067 192/45.001 |
| 2016/0201649 | A1* | 7/2016 | Fujiwara | F16D 41/067 74/405 |
| 2017/0327143 | A1* | 11/2017 | Aramoto | B62D 5/0433 |

* cited by examiner

CLUTCH AND ACTUATOR INCLUDING THE SAME

INCORPORATION BY REFERENCE

The disclosure of Japanese Patent Application No. 2017-072086 filed on Mar. 31, 2017 including the specification, drawings and abstract, is incorporated herein by reference in its entirety.

BACKGROUND OF THE INVENTION

1. Field of the Invention

The present invention relates to a clutch and an actuator including the clutch.

2. Description of the Related Art

Hitherto, there is known a power sliding door configured to automatically open or close a sliding door of an automobile. Japanese Patent Application Publication No. 2009-121606 (JP 2009-121606 A) describes a sliding-door driving actuator configured to open or close a sliding door of an automobile. This actuator includes a motor, a speed reducer, and an output shaft. The speed reducer reduces the speed of rotation of the motor. A torque increased by the speed reducer is applied to the output shaft. The output shaft is coupled to an output drum so as to be rotatable together with the output drum. The output drum drives a driving member such as a cable. The sliding door is automatically opened or closed with power output from the output shaft applied to the driving member.

In order to manually open or close the sliding door by a user, it is necessary that the output shaft of the actuator be idled while the power sliding door is not used (that is, while the motor is not driven). Therefore, the actuator described in JP 2009-121606 A further includes a clutch configured to connect or disconnect the speed reducer and the output shaft. For example, an electromagnetic clutch is employed as the clutch.

There is a demand to downsize the actuator to be mounted inside the door. In the actuator described in JP 2009-121606 A, the electromagnetic clutch occupies a large proportion of the volume of the actuator. Therefore, there is a limitation on the downsizing of the actuator as long as the electromagnetic clutch is employed as the clutch. In order to downsize the sliding-door driving actuator, the inventors of the present invention contemplate employing a mechanical clutch instead of the electromagnetic clutch. In this case, it is necessary that the mechanical clutch connect or disconnect the speed reducer and the output shaft. That is, it is necessary that the speed reducer and the output shaft be connected while the motor is driven, and be disconnected while the motor is not driven. Therefore, it is necessary that the mechanical clutch achieve the connected state while the torque is applied to an outer ring, and achieve the disconnected state while the torque is not applied to the outer ring. There is a demand to develop such a mechanical clutch.

This issue is not confined to the sliding-door driving actuator, but is common to actuators including a motor and required to have an idled state of an output shaft.

SUMMARY OF THE INVENTION

It is one object of the present invention to provide a mechanical clutch to be brought into a connected state while a torque is applied to an outer ring, and into a disconnected state while the torque is not applied to the outer ring, and also to provide an actuator that includes the mechanical clutch and is capable of satisfactorily connecting or disconnecting a motor and an output shaft.

A clutch according to one aspect of the present invention has the following features in its structure. That is, the clutch includes an outer ring, an inner ring, and rolling elements. The outer ring has an inner peripheral surface portion. The inner ring has an outer peripheral surface portion that faces the inner peripheral surface portion. A plurality of hollow spaces, in each of which both ends in a circumferential direction are relatively narrow and a central portion in the circumferential direction is relatively wide, are formed along the circumferential direction between the inner peripheral surface portion and the outer peripheral surface portion. The rolling elements are provided in the respective hollow spaces. While a radial load is not applied to one of the outer ring and the inner ring, each of the rolling elements does not engage with the outer peripheral surface portion or the inner peripheral surface portion, so that a clearance is generated. While the radial load is applied to the one of the outer ring and the inner ring, each of the rolling elements engages with the outer peripheral surface portion and the inner peripheral surface portion without the clearance.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
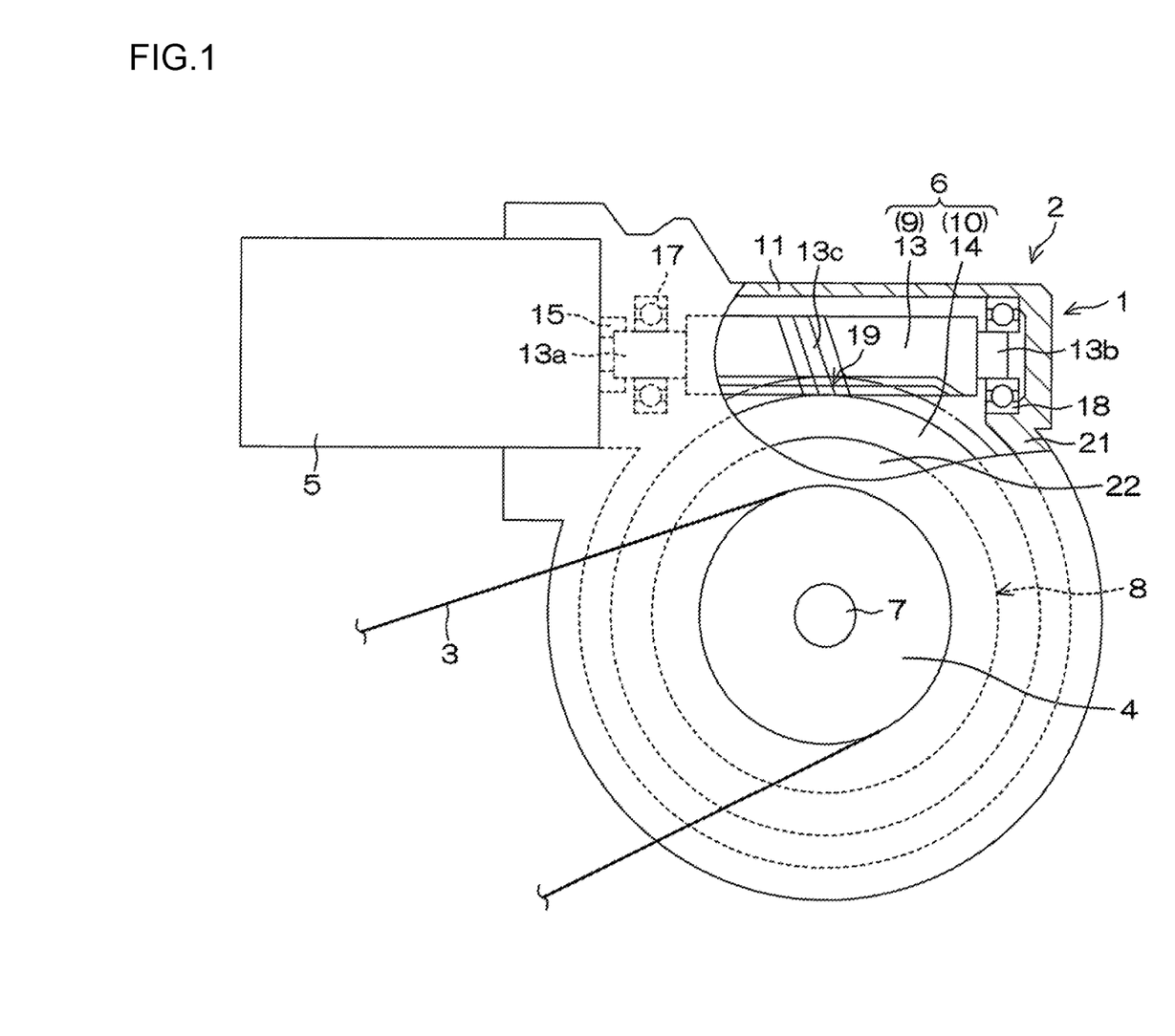
FIG. 1 is a side view illustrating the schematic structure of an actuator according to one embodiment of the present invention.

An embodiment of the present invention is described below in detail with reference to the accompanying drawings. FIG. 1 is a side view illustrating the schematic structure of a sliding-door driving apparatus 2 on which an actuator 1 is mounted according to one embodiment of the present invention. A sliding door (not illustrated) is provided at an opening on the face of a body of a vehicle (not illustrated). The sliding door opens or closes the opening. The sliding door is provided so as to be slidable in a fore-and-aft direction of the vehicle between a closed position where the opening is closed and a full open position where the opening is fully open. The sliding-door driving apparatus 2 is capable of moving the sliding door from the closed position to the full open position or from the full open position to the closed position. A direction orthogonal to the drawing sheet of FIG. 1 coincides with a thickness direction of the sliding door.

The sliding-door driving apparatus 2 includes a cable 3, a rotary drum 4, and the actuator 1. One end side of the cable 3 is coupled to the sliding door. The cable 3 is laid across the rotary drum 4. The actuator 1 rotates the rotary drum 4. The actuator 1 rotates the rotary drum 4 to drive (wind up or loosen) the cable 3, thereby opening or closing the sliding door. The actuator 1 includes a motor 5, a speed reducer 6, an output shaft 7, and a clutch 8. The speed reducer 6 reduces the speed of rotation of the motor 5. A torque increased by the speed reducer 6 is applied to the output shaft 7. The clutch 8 connects or disconnects the speed reducer 6 and the output shaft 7.

For example, the motor 5 is an electromagnetic motor. The motor 5 is provided so as to be rotatable in forward and reverse directions. The speed reducer 6 includes a first gear 9, a second gear 10, and a gear housing 11. The first gear 9 is driven to rotate by the motor 5. The second gear 10 meshes with the first gear 9. The gear housing 11 houses the first gear 9 and the second gear 10. The gear housing 11 is formed into a tubular shape.

In this embodiment, the first gear 9 is a worm shaft 13, and the second gear 10 is a worm wheel 14. The worm shaft 13 has one end 13a, the other end 13b, and an intermediate portion 13c. The one end 13a is an end located on the motor 5 side. The other end 13b is located opposite to the one end 13a. The intermediate portion 13c is located between the ends 13a and 13b, and worm teeth are formed on the intermediate portion 13c. The one end 13a of the worm shaft 13 is coupled to an output shaft 15 of the motor 5 so that power is transmissible from the motor 5. The worm shaft 13 is supported on the gear housing 11 in a rotatable manner via bearings 17 and 18 corresponding to the one end 13a and the other end 13b, respectively.

The worm wheel 14 is externally fitted and fixed to an outer ring 22 of the clutch 8 that is described next. The worm wheel 14 surrounds the outer ring 22, and teeth are formed on the outer periphery of the worm wheel 14. In this embodiment, the worm wheel 14 is formed by using a resin material. In a meshing area 19 between the worm shaft 13 and the worm wheel 14, the worm wheel 14 receives a meshing reactive force (driving reactive force) from the worm shaft 13 when the torque is transmitted from the worm shaft 13 to the worm wheel 14.

Figure 2:
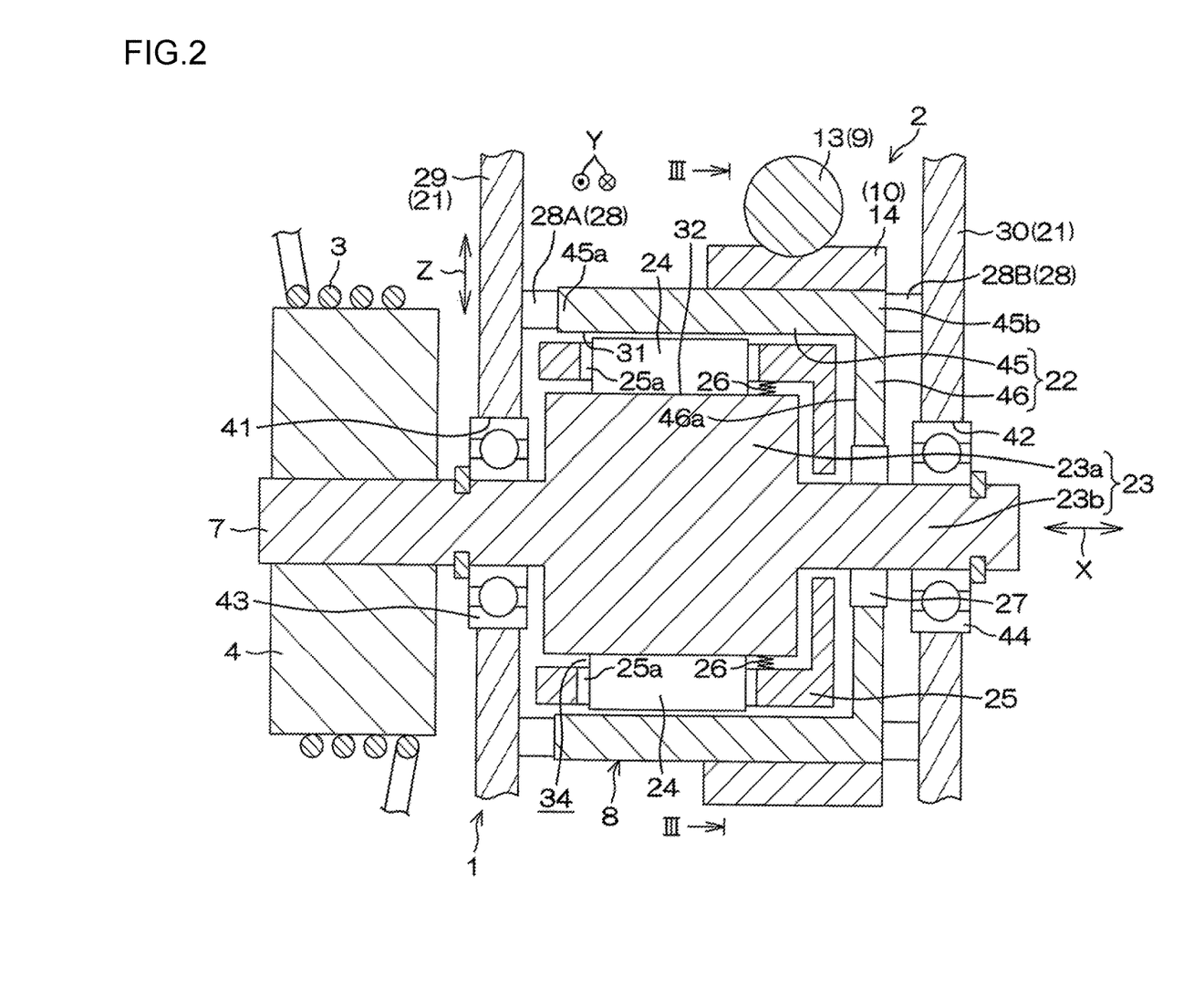
FIG. 2 is a sectional view illustrating the structure of a main part of a clutch included in the actuator.
Figure 3:
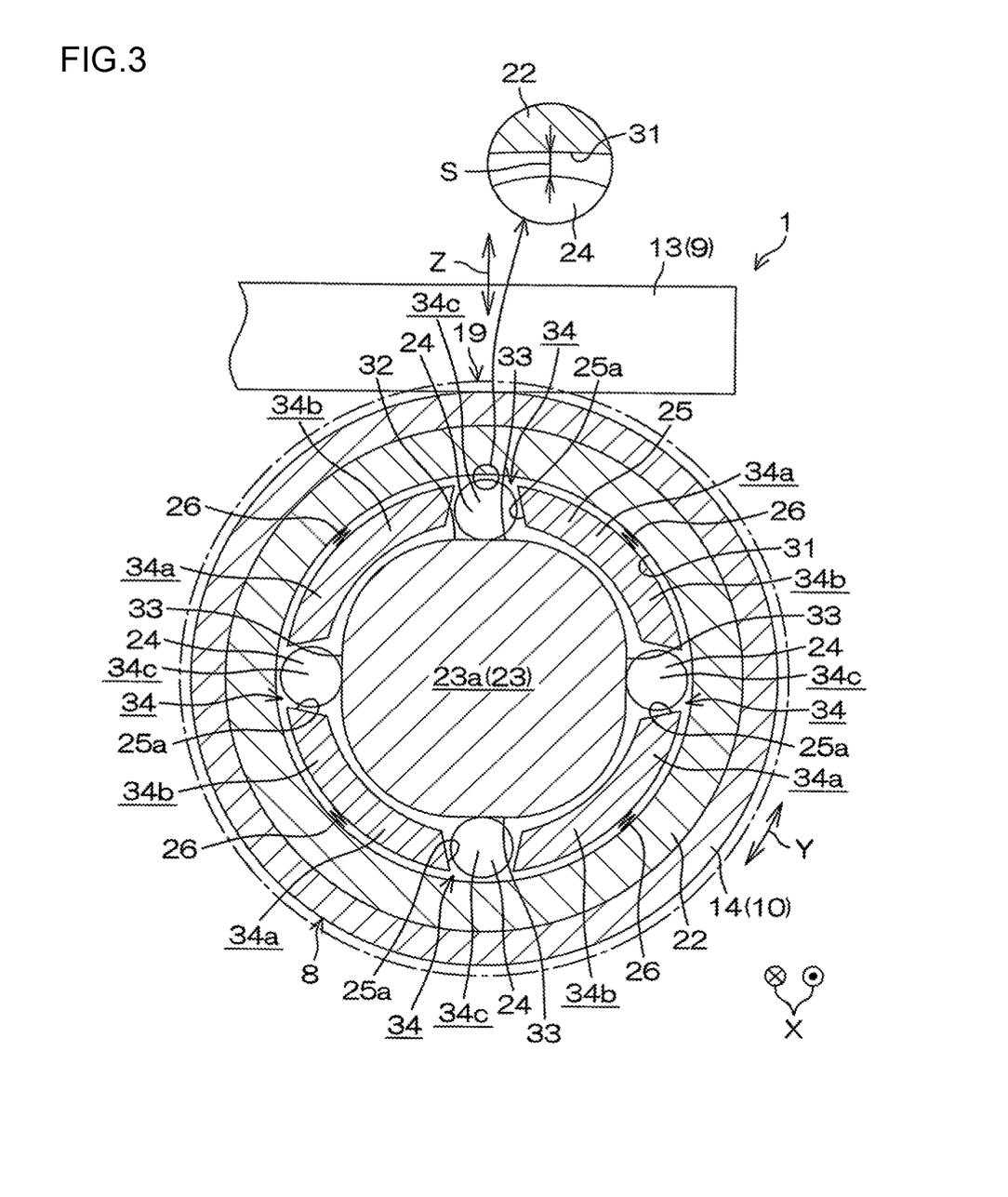
FIG. 3 is a view taken along a line III-III of a cutting plane in FIG. 2.

FIG. 2 is a sectional view illustrating the structure of a main part of the clutch 8. FIG. 3 is a view taken along a line III-III of a cutting plane in FIG. 2. The clutch 8 is a mechanical two-way clutch. The clutch 8 includes a clutch housing (housing) 21, the outer ring 22, an inner ring 23, a plurality of rolling elements 24, a cage 25, cage urging units (cage urging portions) 26, a first elastic body 27, and a second elastic body 28. The clutch 8 is switched between a connected state in which the torque is transmitted between the outer ring 22 and the inner ring 23 and a disconnected state in which the torque transmission between the outer ring 22 and the inner ring 23 is interrupted. The clutch 8 is a clutch to be brought into the disconnected state while a radial load is not applied to the outer ring 22, and into the connected state while the radial load is applied to the outer ring 22.

An axial direction of the outer ring 22 and the inner ring 23 coincides with an axial direction of the output shaft 7, and is referred to as an axial direction X. A circumferential direction of the outer ring 22 and the inner ring 23 is referred to as a circumferential direction Y. A radial direction of the outer ring 22 and the inner ring 23 is referred to as a radial direction Z. The clutch housing 21 includes first and second partition walls 29 and 30 spaced away from each other in the axial direction X. The first and second partition walls 29 and 30 extend in parallel to each other. The clutch housing 21 houses the outer ring 22, the inner ring 23, the rolling elements 24, the cage 25, the cage urging units 26, the first elastic body 27, and the second elastic body 28.

The first and second partition walls 29 and 30 have first and second insertion holes 41 and 42 through which the output shaft 7 and a shaft portion 23b of the inner ring 23 that is described next are inserted, respectively. Third and fourth bearings 43 and 44 are arranged at peripheral edge portions of the first and second insertion holes 41 and 42, respectively. The inner ring 23 is provided coaxially and integrally with the output shaft 7. For example, the inner ring 23 is formed by using a steel material. The inner ring 23 includes a large-diameter portion 23a and the shaft portion 23b that is provided coaxially and integrally with the large-diameter portion 23a. The large-diameter portion 23a has an outer peripheral surface portion 32 that faces an inner peripheral surface portion 31. The outer peripheral surface portion 32 includes a plurality of (for example, four) cam faces 33.

For example, the outer ring 22 is formed by using a steel material. The outer ring 22 includes a tubular portion 45 and a covering portion 46 that covers the other end side (right side in FIG. 2) of the tubular portion 45. The tubular portion 45 has the cylindrical inner peripheral surface portion 31. As described above, the worm wheel 14 is externally fitted and fixed to the outer periphery of the outer ring 22 (tubular portion 45). That is, the tubular portion 45 of the outer ring 22 functions as a metal core of the worm wheel 14.

The first elastic body 27 is interposed between the inner periphery of the covering portion 46 of the outer ring 22 and the outer periphery of the shaft portion 23b of the inner ring 23. The first elastic body 27 has an annular shape, and is supported on the shaft portion 23b of the inner ring 23 so as to be rotatable together with the inner ring 23. The first elastic body 27 is in sliding contact with an inner peripheral surface 46a of the covering portion 46 of the outer ring 22 to support the outer ring 22. The first elastic body 27 is provided so as to be elastically deformable in the radial direction Z. Therefore, the outer ring 22 supported by the first elastic body 27 is movable in the radial direction Z. For example, a tolerance ring or a rubber ring is employed as the first elastic body 27.

The outer ring 22 is supported by the clutch housing 21 via the second elastic body 28. The second elastic body 28 includes a second elastic body 28A located on one end side, and a second elastic body 28B located on the other end side. The second elastic body 28A is interposed between the first partition wall 29 and one end 45a of the tubular portion 45. The second elastic body 28B is interposed between the second partition wall 30 and the other end 45b of the tubular portion 45. The second elastic body 28 has an annular shape that surrounds the inner ring 23, and is retained by the first and second partition walls 29 and 30 so as to be rotatable together with the inner ring 23. The second elastic bodies 28A and 28B are in sliding contact with the one end 45a and the other end 45b of the tubular portion 45 to support the outer ring 22 in contact from lateral sides, respectively. That is, the second elastic bodies 28A and 28B are in frictional contact with lateral portions of the outer ring 22. Therefore, the outer ring 22 is urged in a static state. For example, a rubber ring is employed as the second elastic body 28.

A plurality of (four in the example of FIG. 3) wedge spaces (hollow spaces) 34 are formed along the circumferential direction Y between the inner peripheral surface portion 31 of the outer ring 22 and the outer peripheral surface portion 32 of the inner ring 23. The wedge spaces 34 are defined by the inner peripheral surface portion 31 of the outer ring 22 and the cam faces 33 of the inner ring 23. The cam face 33 is a flat face perpendicular to the radial direction Z. The cam faces 33 are provided at regular intervals in the circumferential direction Y. In each wedge space 34, one end 34a in the circumferential direction Y (end in the circumferential direction) and the other end 34b in the circumferential direction Y (end in the circumferential direction) are relatively narrow, and a central portion 34c in the circumferential direction Y is relatively wide. In other words, each wedge space 34 is narrower toward both ends in the circumferential direction Y.

The rolling element 24 is provided in each wedge space 34. In the example of FIG. 3, one rolling element 24 is provided in each wedge space 34. In each wedge space 34, the rolling element 24 is provided so as to be rollable in the circumferential direction Y. For example, the rolling element 24 is a roller. The cage 25 is a cylindrical cage configured to retain the plurality of (for example, four) rolling elements 24 at predetermined intervals in the circumferential direction Y. A plurality of (as many as the rolling elements 24; for example, four) cage pockets 25a (see FIG. 2) passing through the cage 25 in the radial direction Z are formed while being arranged at regular intervals in the circumferential direction Y. The cage 25 is housed between the inner peripheral surface portion 31 of the outer ring 22 and the outer peripheral surface portion 32 of the inner ring 23. That is, the cage 25 is arranged substantially coaxially with the inner ring 23. One rolling element 24 is housed in each cage pocket 25a of the cage 25. As described above, each rolling element 24 is rollable in the circumferential direction Y in each wedge space 34, and therefore the cage 25 rotates in the circumferential direction Y along with the rolling of the four rolling elements 24. A pressed cage, a machined cage, a molded cage, or the like may be employed as the cage 25.

The cage urging unit 26 elastically urges each rolling element 24 retained by the cage 25 so that the rolling element 24 is arranged in the central portion 34c of the wedge space 34 in a state in which no force is applied to the rolling element 24. In the cage urging unit 26, the inner end in the radial direction Z is fixed to the outer peripheral surface portion 32 of the inner ring 23, and the outer end in the radial direction Z is connected to the cage 25. In the example of FIG. 3, a plurality of cage urging units 26 are provided so as to be distributed in the circumferential direction Y. For example, the cage urging units 26 are formed by using leaf springs. In order to simplify the illustration, the illustration of the cage urging units 26 is omitted in FIG. 4 to FIG. 9.

Figure 4:
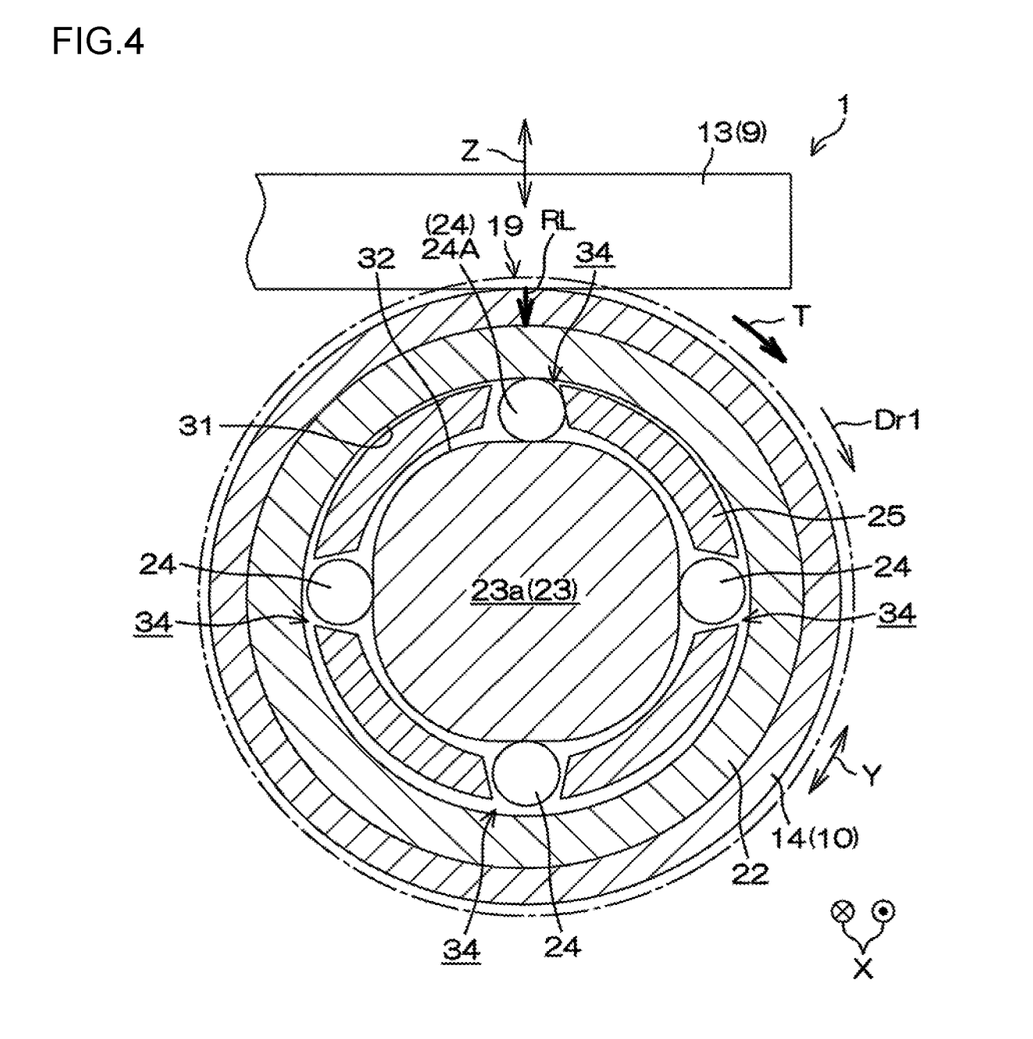
FIG. 4 is a view taken along the line III-III of the cutting plane in FIG. 2.
Figure 5:
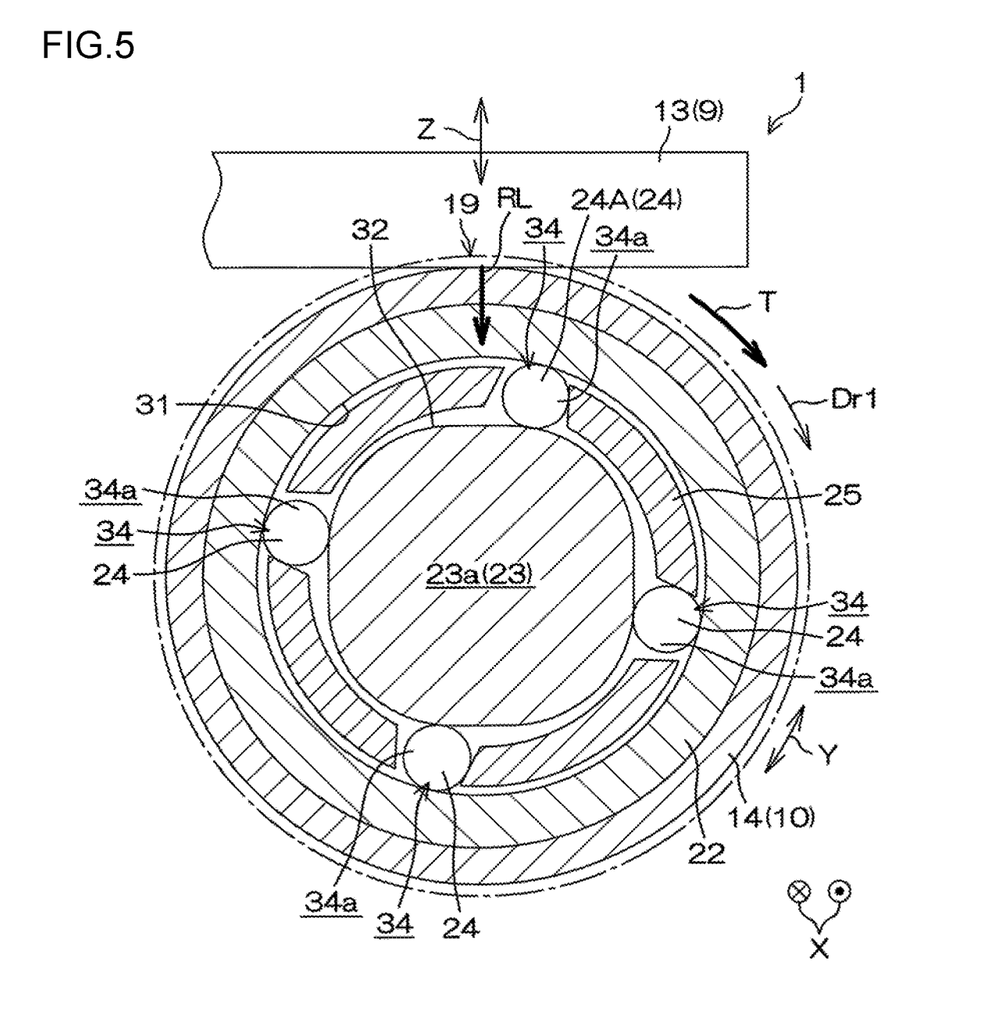
FIG. 5 is a view taken along the line III-III of the cutting plane in FIG. 2.
Figure 6:
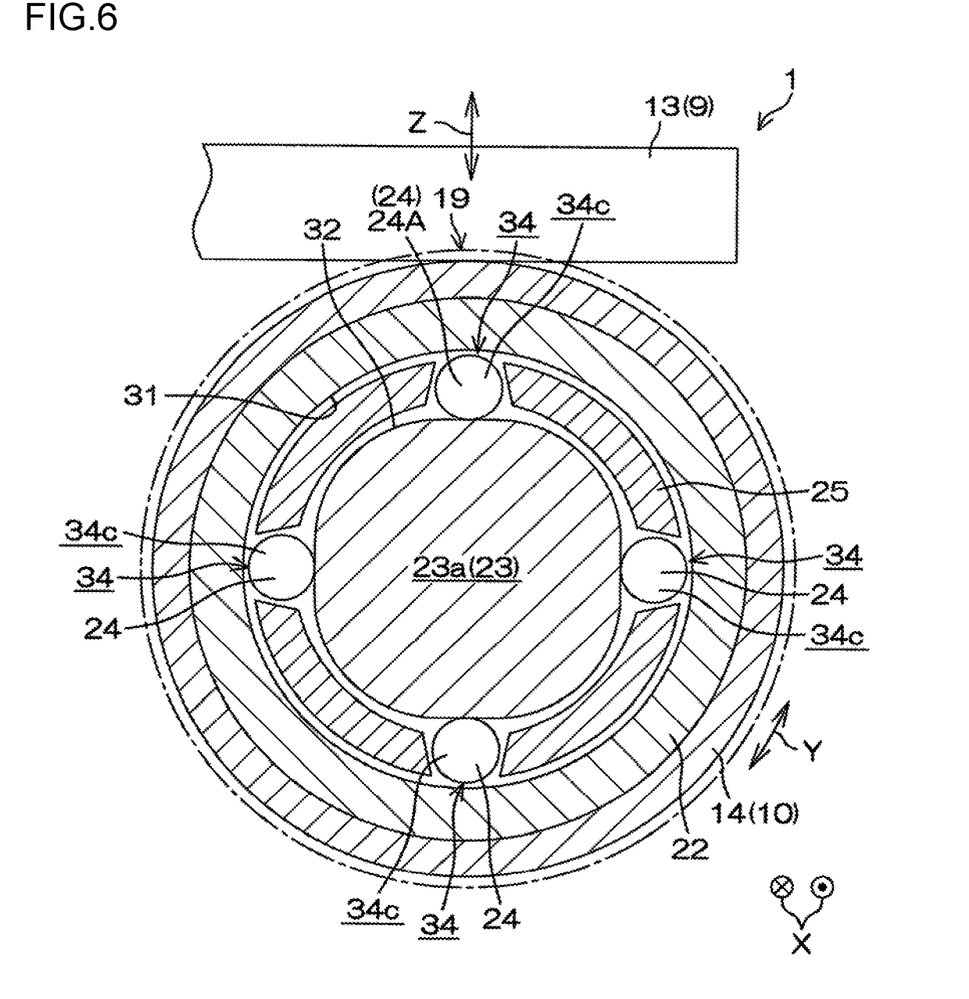
FIG. 6 is a view taken along the line III-III of the cutting plane in FIG. 2.
Figure 7:
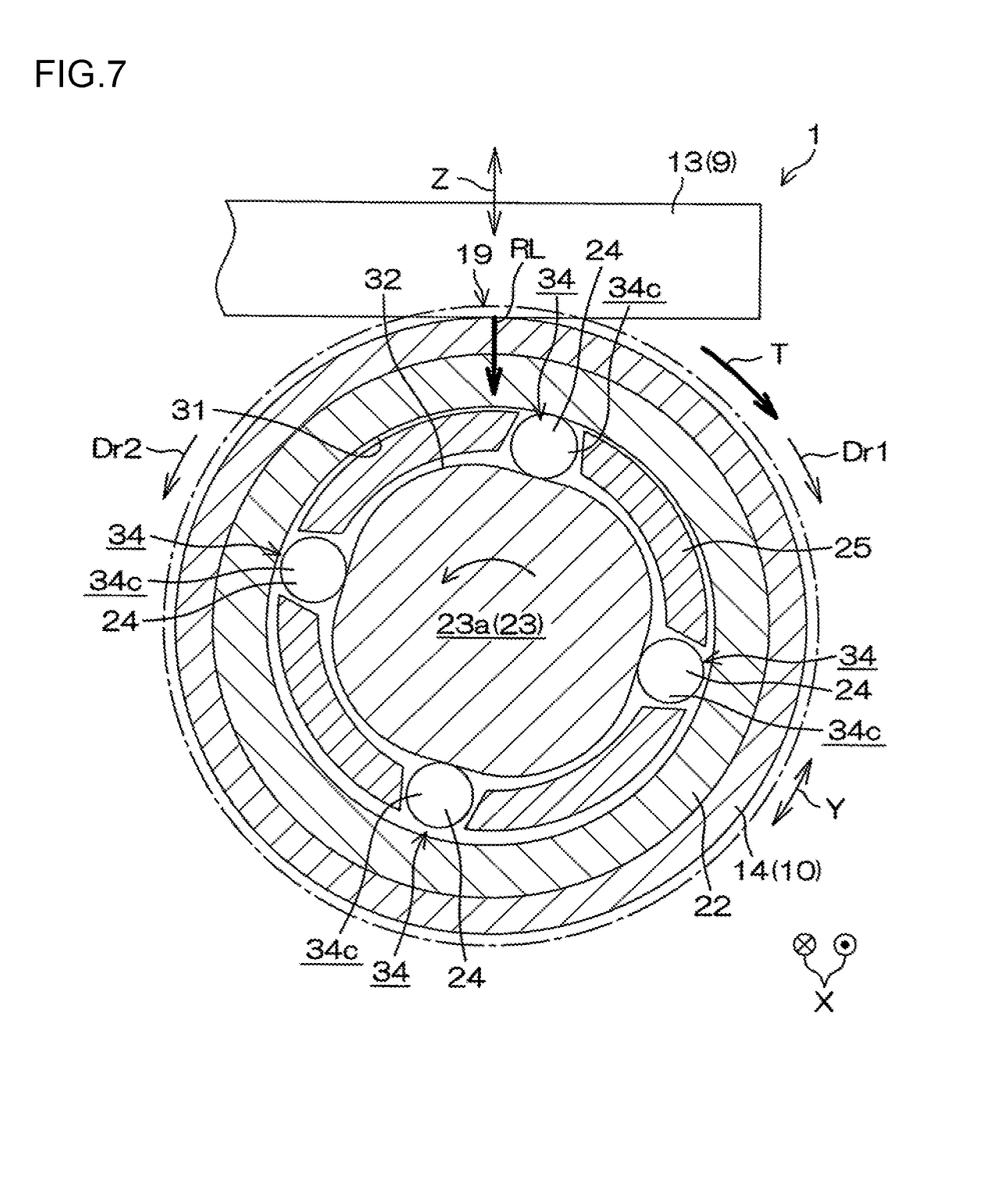
FIG. 7 is a view taken along the line III-III of the cutting plane in FIG. 2.
Figure 8:
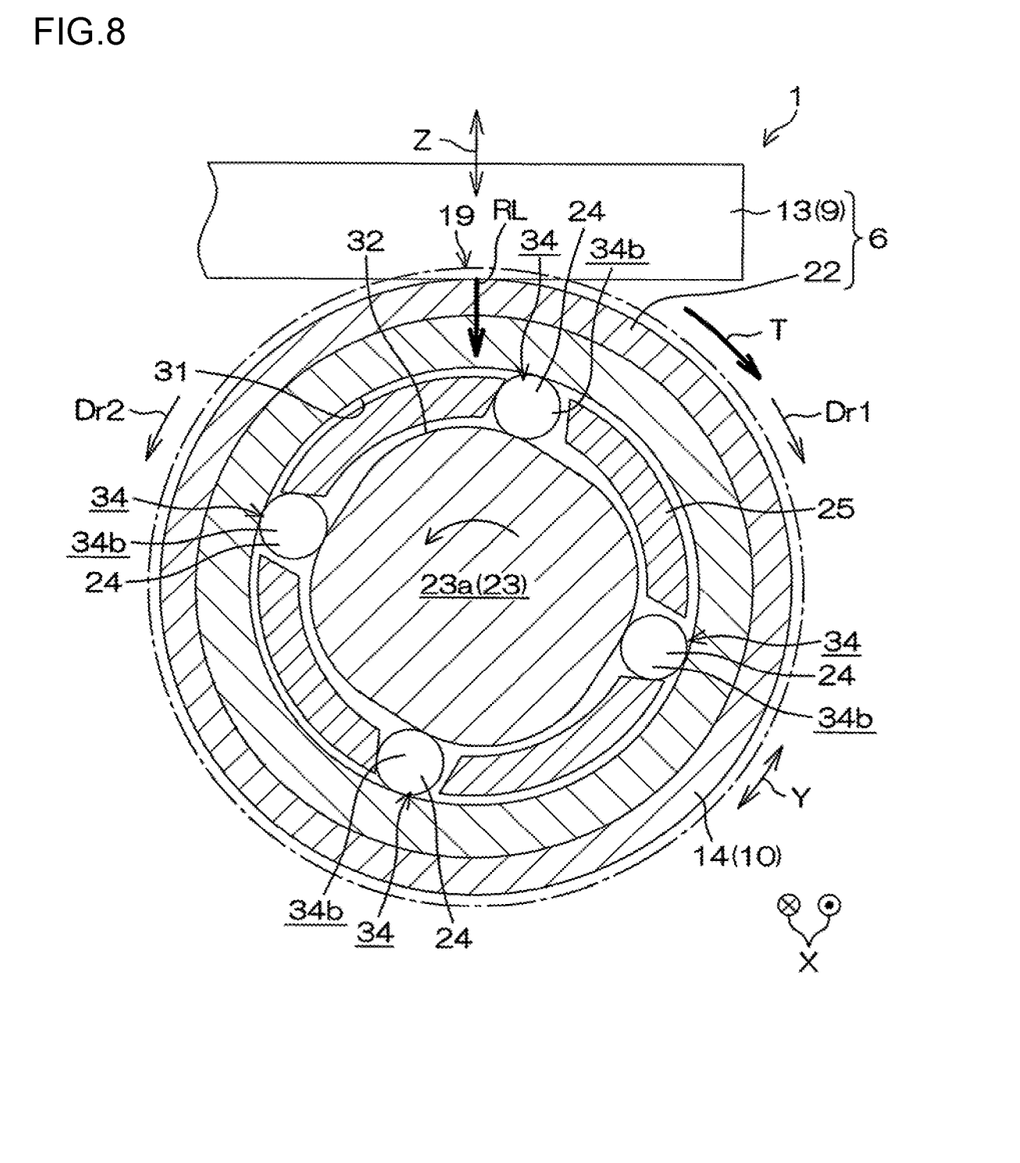
FIG. 8 is a view taken along the line III-III of the cutting plane in FIG. 2.

FIG. 4 is a sectional view illustrating a state of the clutch 8 immediately after the driving of the motor 5 in the forward direction is started (transmission of a torque T is started). FIG. 5 is a sectional view illustrating a state of the clutch 8 during driving of the motor 5 in the forward direction (during the transmission of the torque T). FIG. 6 is a sectional view illustrating a state of the clutch 8 after the driving of the motor 5 is stopped. FIG. 7 and FIG. 8 are sectional views each illustrating a state of the clutch 8 when power is reversely input to the output shaft 7 during the driving of the motor 5.

Transition of the state of the clutch 8 is described below with reference to FIG. 1 to FIG. 8. FIG. 3 illustrates a state of the clutch 8 before the motor 5 is driven. In this state, a radial load RL (see FIG. 4 or the like) is not applied to the outer ring 22 from the meshing area 19 because the torque is not transmitted. The annular first elastic body 27 urges the outer ring 22 outward in the radial direction Z over the entire periphery in the circumferential direction Y. Therefore, while the radial load RL is not applied to the outer ring 22, the outer ring 22 is arranged at a desired position where the outer ring 22 is coaxial with the inner ring 23. Further, each rolling element 24 is arranged in the central portion 34c of the wedge space 34 by the cage urging unit 26 (see FIG. 2 and FIG. 3). Thus, before energization of the motor 5 is started, that is, before the motor 5 is driven, each rolling element 24 does not engage with the outer peripheral surface portion 32 or the inner peripheral surface portion 31, so that a clearance S is generated as illustrated in FIG. 3. That is, the clutch 8 is brought into the disconnected state.

Transition is made from the state illustrated in FIG. 3, and the energization of the motor 5 is started to rotate the motor 5 in the forward direction. Along with the rotation of the motor 5 in the forward direction, the second gear 10 and the outer ring 22 rotate in a first rotational direction Dr1 as illustrated in FIG. 4. Along with the start of the driving of the motor 5, a meshing reactive force from the first gear 9 is generated in the second gear 10 in the meshing area 19. At the start of the driving of the motor 5, the meshing reactive force is small, but is then increased gradually. Then, a component of the meshing reactive force in the radial direction Z, which is received by the second gear 10 from the first gear 9, is applied as the radial load. Since the second gear 10 is externally fitted and fixed to the outer periphery of the outer ring 22, the component of the meshing reactive force in the radial direction Z is directly applied as the radial load. Since the outer ring 22 is supported so as to be movable in the radial direction Z, the radial load is applied to the second gear 10. Thus, the outer ring 22 moves in the radial direction Z so as to approach the inner ring 23.

At this time, the clearance S between the rolling element 24 and the inner peripheral surface portion 31 is reduced in the wedge space 34 closest to the meshing area 19 (in other words, the wedge space 34 in a load zone of the radial load RL) out of the four wedge spaces 34. In the following description, the rolling element 24 provided in the wedge space 34 closest to the meshing area 19 may be referred to as "first rolling element 24A". When the driving of the motor 5 is further continued, the outer ring 22 further approaches the inner ring 23, so that the clearance S is eliminated. Thus, the first rolling element 24A engages with both of the inner peripheral surface portion 31 and the outer peripheral surface portion 32. After the driving of the motor 5 is started, the outer ring 22 rotates relative to the inner ring 23. Therefore, the rolling element 24 that engages with both of the inner peripheral surface portion 31 and the outer peripheral surface portion 32 then rolls in the wedge space 34 in the first rotational direction Dr1 along with the rotation of the outer ring 22. The four rolling elements 24 are retained by the cage 25 so as to be rollable in the circumferential direction Y in association with each other. Therefore, along with the rolling of the first rolling element 24A, the remaining three rolling elements 24 also roll in the first rotational direction Dr1. Then, as illustrated in FIG. 5, each of the remaining rolling elements 24 engages with both of the inner peripheral surface portion 31 and the outer peripheral surface portion 32 in the vicinity of the one end 34a of the wedge space 34. Then, all of the four rolling elements 24 engage with both of the inner peripheral surface portion 31 and the outer peripheral surface portion 32. Thus, the clutch 8 is brought into the connected state. In this state, the torque T is transmitted from the second gear 10 to the output shaft 7 via the clutch 8. In this case, the output shaft 7 can rotate the rotary drum 4 in one direction. Thus, the cable 3 is driven (wound up or loosened), thereby opening or closing the sliding door.

When the energization of the motor 5 is stopped (that is, when the driving of the motor 5 is stopped) in the state illustrated in FIG. 5, the meshing reactive force is not generated in the meshing area 19. As a result, the application of the torque T to the outer ring 22 is stopped. Therefore, the force for retaining the rolling element 24 in the vicinity of the one end 34a of the wedge space 34 (that is, the engaging position) is not applied. Thus, each rolling element 24 is elastically urged by the cage urging unit 26 (see FIG. 2 and FIG. 3) to roll toward the central portion 34c of the wedge space 34. Accordingly, each rolling element 24 disengages from the inner peripheral surface portion 31. As a result, the clutch 8 returns from the connected state to the disconnected state.

Next, consideration is made for a case where power is reversely input to the output shaft 7 during the driving of the motor 5. When the reverse power input to the output shaft 7 is such an input that the inner ring 23 rotates relatively in the first rotational direction Dr1, the output shaft 7 and the inner ring 23 rotate in a direction in which each rolling element 24 engages with the inner peripheral surface portion 31 and the outer peripheral surface portion 32 more firmly, and therefore no particular problem arises in this case. Referring to FIG. 7 and FIG. 8, consideration is made for a case where the reverse power input to the output shaft 7 is such an input that the inner ring 23 rotates relatively in a second rotational direction Dr2 opposite to the first rotational direction Dr1.

Along with the reverse power input to the output shaft 7, the inner ring 23 rotates in the second rotational direction Dr2 relative to the outer ring 22. Along with the rotation of the inner ring 23 relative to the outer ring 22, the rolling element 24 rolls in the wedge space 34 in the second rotational direction Dr2. At this time, the rolling element 24 rolls while keeping the zero clearance between the rolling element 24 and the outer peripheral surface portion 32. FIG. 7 illustrates a state in which each rolling element 24 is arranged in the central portion 34c. When the reverse power input to the output shaft 7 is further continued, as illustrated in FIG. 8, each rolling element 24 engages with both of the inner peripheral surface portion 31 and the outer peripheral surface portion 32 in the vicinity of the other end 34b of the wedge space 34. Then, all of the four rolling elements 24 engage with both of the inner peripheral surface portion 31 and the outer peripheral surface portion 32. Thus, the clutch 8 is brought into the connected state. In this state, the torque T is transmitted from the second gear 10 to the output shaft 7 via the clutch 8.

Figure 9:
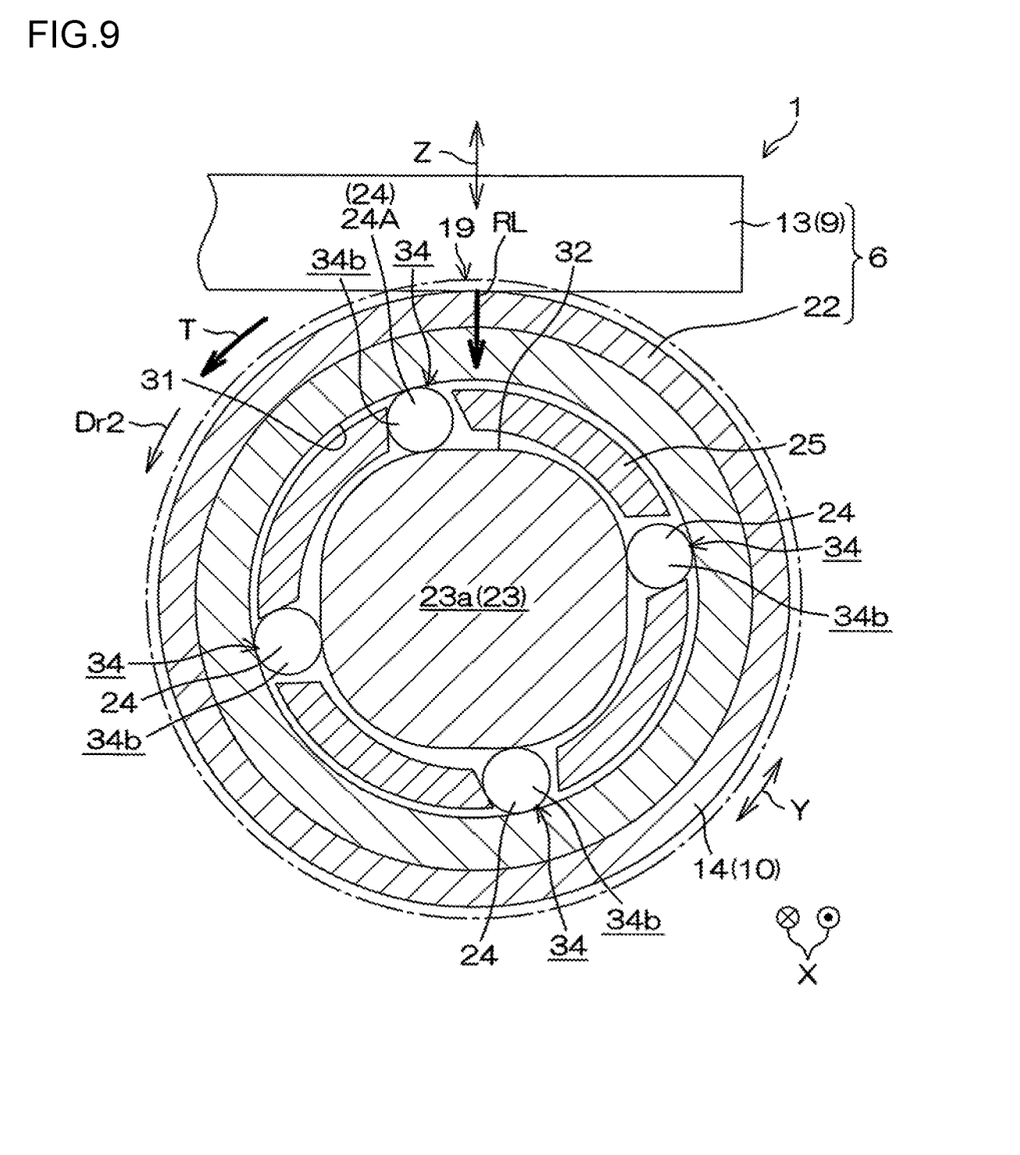
FIG. 9 is a view taken along the line III-III of the cutting plane in FIG. 2.

The speed reducer 6 including the worm shaft 13 and the worm wheel 14 has a high speed reducing ratio, and therefore the reverse power input is canceled in the speed reducer 6. FIG. 9 is a sectional view illustrating a state of the clutch 8 during driving of the motor 5 in the reverse direction (during the transmission of the torque T). Transition is made from the state illustrated in FIG. 3, and the energization of the motor 5 is started to rotate the motor 5 in the reverse direction. Along with the rotation of the motor 5 in the reverse direction, the second gear 10 and the outer ring 22 rotate in the second rotational direction Dr2 as illustrated in FIG. 9. Along with the start of the driving of the motor 5, a meshing reactive force from the first gear 9 is generated in the second gear 10 in the meshing area 19. The outer ring 22 is supported so as to be movable in the radial direction Z. Therefore, a component of the meshing reactive force in the radial direction Z, which is generated in the second gear 10, is applied to the outer ring 22 as the radial load. Thus, the outer ring 22 approaches the inner ring 23. Accordingly, the clearance S between the first rolling element 24A and the inner peripheral surface portion 31 is reduced. When the driving of the motor 5 is further continued, the clearance S is eliminated. Thus, the first rolling element 24A engages with both of the inner peripheral surface portion 31 and the outer peripheral surface portion 32. After the driving of the motor 5 is started, the outer ring 22 rotates relative to the inner ring 23. The first rolling element 24A that engages with both of the inner peripheral surface portion 31 and the outer peripheral surface portion 32 rolls in the wedge space 34 in the second rotational direction Dr2 along with the rotation of the outer ring 22. Along with the rolling of the first rolling element 24A, the remaining three rolling elements 24 also roll in the second rotational direction Dr2. Then, as illustrated in FIG. 9, each of the remaining rolling elements 24 engages with both of the inner peripheral surface portion 31 and the outer peripheral surface portion 32 in the vicinity of the other end 34b of the wedge space 34. All of the four rolling elements 24 engage with both of the inner peripheral surface portion 31 and the outer peripheral surface portion 32, and therefore the clutch 8 is brought into the connected state. In this state, the torque T is transmitted from the second gear 10 to the output shaft 7. While the driving of the motor 5 is continued, the clutch 8 is kept in the connected state. In this case, the output shaft 7 can rotate the rotary drum 4 in the other direction. Thus, the cable 3 is driven (loosened or wound up), thereby closing or opening the sliding door.

As described above, according to this embodiment, when the torque T is transmitted from the speed reducer 6 to the clutch 8, the second gear 10 receives the component of the meshing reactive force in the radial direction Z from the first gear 9. The component in the radial direction Z is applied to the outer ring 22 to which the second gear 10 is externally fitted and fixed. Thus, when the torque T is transmitted from the speed reducer 6 to the clutch 8, the radial load RL is applied to the outer ring 22 along with the torque T. While the radial load RL is not applied to the outer ring 22, each rolling element 24 does not engage with the outer peripheral surface portion 32 or the inner peripheral surface portion 31, and the clutch 8 is brought into the disconnected state. While the radial load RL is applied to the outer ring 22, each rolling element 24 engages with the inner peripheral surface portion 31 and the outer peripheral surface portion 32, and the clutch 8 is brought into the connected state. Therefore, the clutch 8 is brought into the connected state while the torque T is applied to the outer ring 22 from the speed reducer 6, and into the disconnected state while the torque T is not applied to the outer ring 22 from the speed reducer 6. Accordingly, it is possible to satisfactorily connect or disconnect the motor 5 and the output shaft 7 while employing the mechanical clutch 8.

While the radial load RL is not applied to the outer ring 22, the first elastic body 27 elastically urges the outer ring 22 outward in the radial direction Z. Since the first elastic body 27 has an annular shape, the outer ring 22 is elastically urged uniformly over the entire periphery in the circumferential direction Y. Thus, each rolling element 24 does not engage with the outer peripheral surface portion 32 or the inner peripheral surface portion 31. Thus, the disconnected state of the clutch 8 can be achieved while the radial load RL is not applied to the outer ring 22.

The second elastic body 28 is in frictional contact with the outer ring 22, and therefore the outer ring 22 is urged in the static state. In this case, the outer ring is urged in the static state by an even greater force due to the contact achieved by the elastic body. Therefore, the radial load RL applied to the outer ring 22 can be kept larger. Thus, the disconnected state of the clutch 8 can be achieved satisfactorily while the torque is applied to the outer ring 22.

Although one embodiment of the present invention is described above, the present invention may be carried out by other embodiments. For example, the second gear 10 is not limited to the structure in which the second gear 10 is externally fitted and fixed to the outer ring 22. The second gear 10 may be coupled to the outer ring 22 so as to be rotatable together with the outer ring 22. The speed reducer 6 constituted by the first and second gears 9 and 10 may include other parallel type gears instead of including the worm gear.

Figure 10:
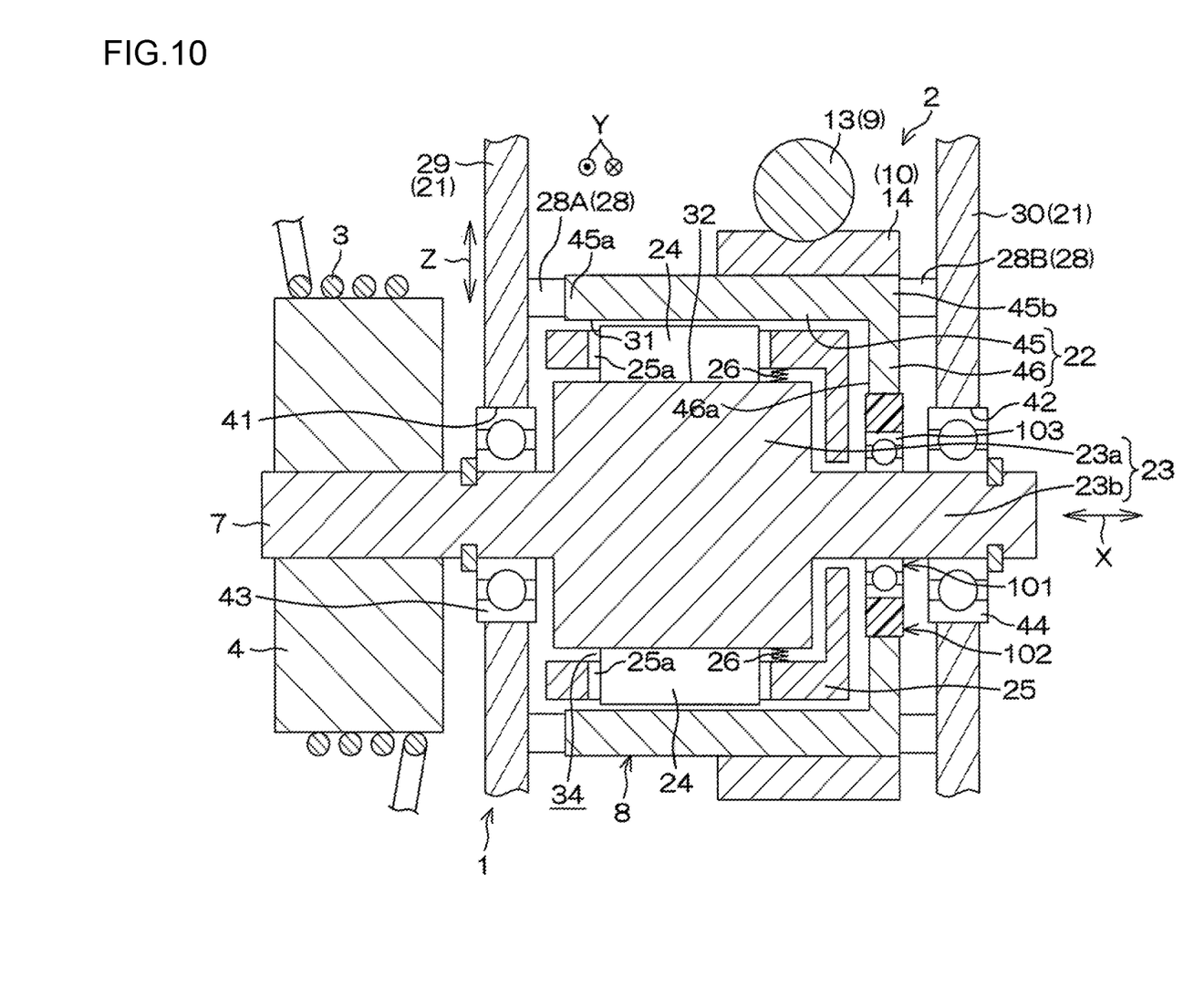
FIG. 10 is an enlarged sectional view illustrating a main part of a clutch according to a modified example.

The first elastic body 27 is exemplified as a support member configured to support the outer ring 22 so that the outer ring 22 is rotatable relative to the inner ring 23 and is movable in the radial direction Z. The support member may be implemented by using a member other than the first elastic body 27. For example, the support member may be constituted by a plurality of members. As an example of this case, a structure including a bearing 101 and an annular first elastic body 102 may be exemplified as illustrated in FIG. 10. The bearing 101 is interposed between the outer ring 22 and the inner ring 23. The first elastic body 102 is interposed between the bearing 101 and the outer ring 22 or the inner ring 23, and is elastically deformable in the radial direction Z. In the example of FIG. 10, the bearing 101 is externally fitted and fixed to the inner ring 23. The first elastic body 102 is interposed between the outer ring 22 and an outer ring 103 of the bearing 101. The bearing 101 is provided coaxially with the inner ring 23. For example, a rubber O-ring may be exemplified as the first elastic body 102. The bearing 101 may be a rolling bearing as illustrated in FIG. 10, or may be a plain bearing.

In this case, similarly to the case of the embodiment described above, the first elastic body 102 elastically urges the outer ring 22 outward in the radial direction Z. The annular first elastic body 102 elastically urges the outer ring 22 uniformly over the entire periphery in the circumferential direction Y. Therefore, each rolling element 24 does not engage with the inner peripheral surface portion 31 or the outer peripheral surface portion 32 while the radial load RL is not applied to the outer ring 22. Thus, the disconnected state of the clutch 8 can be achieved while the radial load RL is not applied to the outer ring 22.

The cage urging unit 26 configured to elastically urge the cage 25 is described as an example of an urging portion configured to elastically urge each rolling element 24 toward the central portion 34c of the wedge space 34. The urging portion may be configured to directly urge each rolling element 24 instead of the cage 25. Description is given of the exemplary case where the number of wedge spaces 34 provided along the circumferential direction Y is four. The number of wedge spaces 34 may be two, three, five, or more.

Description is given of the exemplary structure in which one rolling element 24 is arranged in each wedge space 34. The number of rolling elements 24 arranged in the wedge space 34 may be two or more. As the rolling element 24, other rolling elements such as a ball may be used instead of the roller. The cage urging unit 26 is not limited to the leaf spring, but other spring members such as a coil spring may be employed.

The present invention is not limited to the structure in which the output shaft 7 and the inner ring 23 are provided integrally. The output shaft 7 and the inner ring 23 may be formed of separate members. Description is given of the exemplary structure of the clutch 8 in which the outer ring 22 is coupled to the second gear 10 so as to be rotatable together with the second gear 10. Instead of the outer ring 22, the inner ring 23 may be coupled to the second gear 10 so as to be rotatable together with the second gear 10.

In this case, a support member configured to support the inner ring 23 so that the inner ring 23 is rotatable relative to the outer ring 22 and is movable in the radial direction Z is provided in place of the first elastic body 27. For example, the support member is an elastic body provided between the outer ring 22 and the inner ring 23 so as to be rotatable together with the inner ring 23. The elastic body is provided in sliding contact with the outer ring 22, and is elastically deformable in the radial direction Z. In this case, a friction member that is brought into frictional contact with the inner ring 23 is provided as the second elastic body 28.

Description is given of the structure in which the cam faces 33 are provided on the outer peripheral surface portion 32 of the inner ring 23. The cam faces 33 may be provided on the inner peripheral surface portion 31 of the outer ring 22. The actuator according to the present invention is applicable not only to the sliding-door driving actuator, but also to other actuators such as a back-door driving actuator. In addition, various modifications may be made to the present invention within the scope of claims.

What is claimed is:

1. A clutch, comprising:
   an outer ring having an inner peripheral surface portion;
   an inner ring having an outer peripheral surface portion that faces the inner peripheral surface portion;
   rolling elements, wherein
      a plurality of hollow spaces, in each of which both ends in a circumferential direction are relatively narrow and a central portion in the circumferential direction is relatively wide, are formed along the circumferential direction between the inner peripheral surface portion and the outer peripheral surface portion,
      the rolling elements are provided in the respective hollow spaces,
      while a radial load is not applied to one of the outer ring and the inner ring, each of the rolling elements does not engage with the outer peripheral surface portion or the inner peripheral surface portion, so that a clearance is generated, and
      while the radial load is applied to the one of the outer ring and the inner ring, each of the rolling elements engages with the outer peripheral surface portion and the inner peripheral surface portion without the clearance;
   a support member configured to support the one of the outer ring and the inner ring so that the one of the outer ring and the inner ring is rotatable relative to the other one of the outer ring and the inner ring and is movable in a radial direction;
   a cage configured to retain the plurality of rolling elements so that the rolling elements are rollable in the circumferential direction in association with each other; and
   an urging portion configured to elastically urge each of the rolling elements toward the central portion.

2. The clutch according to claim 1, wherein the support member includes an annular first elastic body interposed between the outer ring and the inner ring, provided so as to be rotatable together with the other one of the outer ring and the inner ring, brought into sliding contact with the one of the outer ring and the inner ring, and elastically deformable in the radial direction.

3. The clutch according to claim 1, wherein the support member includes:
   a bearing interposed between the outer ring and the inner ring; and
   an annular first elastic body interposed between the bearing and the outer ring or the inner ring, and elastically deformable in the radial direction.

4. The clutch according to claim 1, wherein the urging portion includes a cage urging portion configured to elastically urge the cage.

5. An actuator, comprising:
   a motor;
   a first gear coupled to the motor;
   a second gear that meshes with the first gear;
   the clutch according to claim 1; and
   an output shaft configured to rotate together with the other one of the outer ring and the inner ring, wherein
   the second gear is coupled to the one of the outer ring and the inner ring so as to be rotatable together with the one of the outer ring and the inner ring.

6. An actuator, comprising:
   a motor;
   a first gear coupled to the motor;
   a second gear that meshes with the first gear;
   the clutch according to claim 2; and
   an output shaft configured to rotate together with the other one of the outer ring and the inner ring, wherein
   the second gear is coupled to the one of the outer ring and the inner ring so as to be rotatable together with the one of the outer ring and the inner ring.

7. An actuator, comprising:
   a motor;
   a first gear coupled to the motor;
   a second gear that meshes with the first gear;
   the clutch according to claim 3; and
   an output shaft configured to rotate together with the other one of the outer ring and the inner ring, wherein
   the second gear is coupled to the one of the outer ring and the inner ring so as to be rotatable together with the one of the outer ring and the inner ring.

8. An actuator, comprising:
   a motor;
   a first gear coupled to the motor;
   a second gear that meshes with the first gear;
   the clutch according to claim 4; and
   an output shaft configured to rotate together with the other one of the outer ring and the inner ring, wherein
   the second gear is coupled to the one of the outer ring and the inner ring so as to be rotatable together with the one of the outer ring and the inner ring.

9. The actuator according to claim 5, wherein the second gear is externally fitted and fixed to the one of the outer ring and the inner ring.

10. The actuator according to claim 5, wherein
    the first gear is a worm shaft, and
    the second gear is a worm wheel.

11. The actuator according to claim 5, wherein the clutch further includes a friction member that is brought into frictional contact with the one of the outer ring and the inner ring.

12. The actuator according to claim 11, wherein
    the clutch further includes a housing that houses the outer ring, the inner ring, and rolling elements, and
    the friction member includes a second elastic body retained by the housing, and brought into sliding contact with the one of the outer ring and the inner ring to elastically support the one of the outer ring and the inner ring.

* * * * *